United States Patent [19]
Bowerfind et al.

[11] 3,789,533
[45] Feb. 5, 1974

[54] FISHING LINE THREADING MEANS FOR TELESCOPIC RODS

[75] Inventors: Albert L. Bowerfind, East Paterson, N.J.; Zvi Aviezer, New York, N.Y.

[73] Assignee: Daggeem, Inc., New York, N.Y.

[22] Filed: Sept. 8, 1971

[21] Appl. No.: 178,759

[52] U.S. Cl. .............................................. 43/18 R
[51] Int. Cl. ............................................ A01k 87/00
[58] Field of Search ............................ 43/18, 23, 24

[56] References Cited
UNITED STATES PATENTS

| | | | |
|---|---|---|---|
| 3,618,253 | 11/1971 | Edwards et al. | 43/23 |
| 2,541,609 | 2/1951 | Pullan | 43/18 |
| 3,417,500 | 12/1968 | Carabasse | 43/18 |

*Primary Examiner*—Warner H. Camp

[57] ABSTRACT

A sectional tubular telescopic rod for fishing or other uses has its innermost section of smallest diameter sufficiently long or lengthened so that when the telescopic sections are fully collapsed, the inner end of the innermost section lies close to the point where the fishing line is fed from a reel thus making it readily possible to thread a fishing line through a tubular rod in a simple and effective manner.

3 Claims, 6 Drawing Figures

Patented Feb. 5, 1974 3,789,533
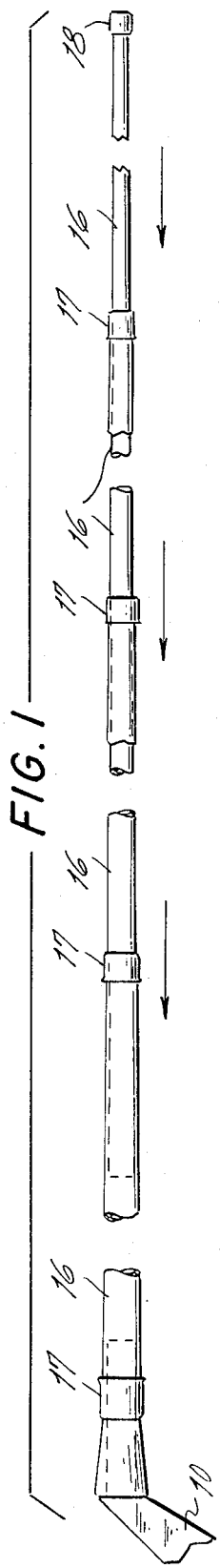
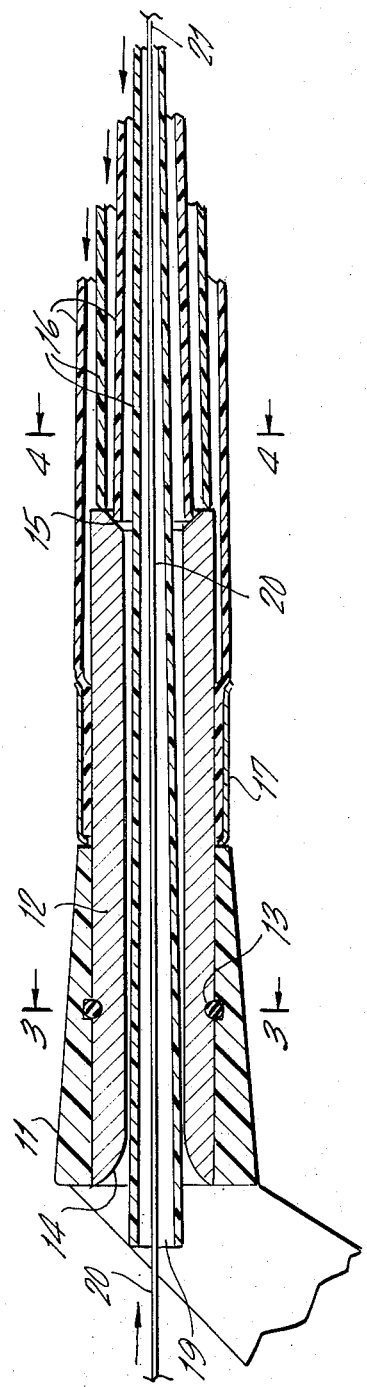
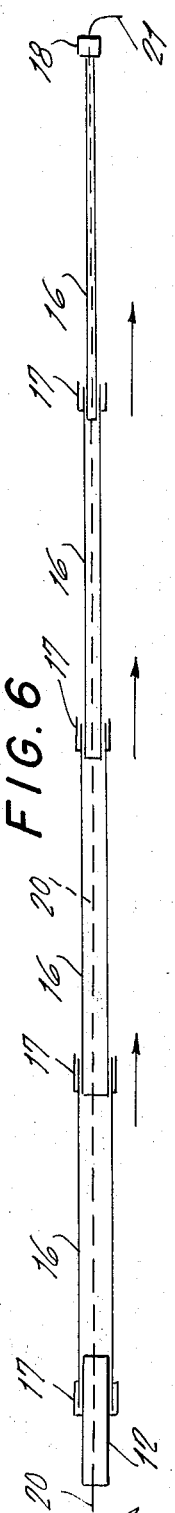
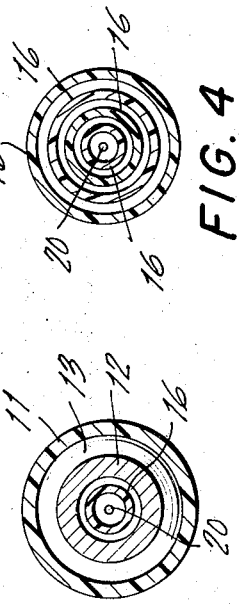
INVENTORS
ALBERT L. BOWERFIND
ZVI AVIEZER
ATTORNEYS

FISHING LINE THREADING MEANS FOR TELESCOPIC RODS

This invention relates to a telescopic fishing rod or other rod which is made up of a number of tubular sections which can be extended or retracted as desired and through the hollow interior of which sections a nylon fishing line or other filamentary material passes. The present arrangement makes it easy to thread the fishing line through the interior of the tubular rod.

IN THE ACCOMPANYING DRAWING:

FIG. 1 is a side elevational view in exploded form of a tubular telescopic fishing rod constructed in accordance with the invention;

FIG. 2 is a partial sectional view on an enlarged scale of the fishing rod of FIG. 1 in fully collapsed condition;

FIG. 3 is a transverse section taken on line 3—3 of FIG. 2;

FIG. 4 is a transverse section taken on line 4—4 of FIG. 2;

FIG. 5 is an elevational view of a detail; and

FIG. 6 illustrates the fishing rod in diagrammatic assembled form in fully extended condition.

Referring to the drawing the fishing rod, which is preferably a hollow Fiberglas sectional telescopic rod, has a handle (reel supporting) portion 10 and a generally frustoconical sleeve portion 11 of a tubular nature which is thickest adjacent the handle portion and thinnest at its distal end. Inwardly of member 11 there is an elongated tubular member 12 which is of substantially uniform thickness from end to end and which is interengaged with the member 11 via an O-ring 13. The end of member 12 adjacent handle portion 10 is smoothly rounded to form a smooth annular curvature 14 and the opposite end of member 12 is bevelled at 15 to form an annular angular shoulder which serves as a limiting stop for collapsing movement of rod sections 16. The fishing rod is composed of a plurality of sections 16 which may be extended and retracted and these sections 16 are provided with ferrules 17 of the nature described and claimed in our copending application Ser. No. 178,760, filed Sept. 8, 1971. At the outermost end of the rod there is also a tungsten carbide tip 18, the nature of which is described and claimed in our copending application Ser. No. 178,761, filed Sept. 8, 1971.

The threading of a nylon line through a tubular collapsible Fiberglas fishing rod presents some difficulty and inconvenience and the major purpose of the present invention is to overcome that disadvantage and to provide a simple and effective arrangement whereby the nylon line can be readily threaded through the rod. For this purpose the innermost rod section 16, which like the other sections becomes progressively smaller in diameter from its inner to its outer end, is made extra long (or has an extension secured thereto) and is of such total length that when the innermost rod section 16 is in its maximum collapsed or retracted position as shown in FIG. 2 one end thereof presents an opening 19 closely adjacent to the nylon fishing line 20 or other filamentary material which is on a fishing reel (not shown) from which the nylon line feeds axially or tangentially, although it will be appreciated that by appropriate design of the handle portion 10 on which the reel is mounted the present invention is capable of use with any type of reel.

In order to carry out the threading with the parts in the position shown in FIG. 2 the free end of the nylon line is preferably fed by the fingers preferably 1 or 1½ inches at a time and the nylon line has sufficient rigidity to readily permit this to be done until the free end of the nylon line projects through the longest but smallest diameter rod section, whereupon the end 21 of the nylon line can be grasped by the fingers and pulled through the rod far enough to have a sinker and a fishing hook and the like secured thereto. Alternatively, the free end of the nylon line may be attached to a slender "needle" with an "eye" to which the end of the nylon line can be attached and then this needle easily passes through innermost rod section 16 which is tilted so that the "needle" or other weight will slide along the inner surface of innermost section 16 and out the opposite end through the passageway provided in the carbide tip 18 and then the usual fishing accessories are applied to the end of the fishing line. After the threading is carried out the various retracted rod sections are then pulled out to fully extended position whereupon the rod is ready for use. It will be noted from FIG. 2 in particular that the bevelled surface 15 acts as a limiting stop so that intermediate rod sections 16 do not move an excessive distance or interfere with the movement of the innermost section 16 all the way back through the member 12.

Tubular sectional Fiberglas fishing rods of telescopic construction are "willowy" and readily flexed. The construction described above and the internal passage of the fishing line through the hollow rod do not in any way interfere with flexing of the rod or the reeling in and out of the fishing line and in fact contribute thereto. The present rod also has the advantage that there are no external rings through which the fishing line passes and therefore the line is not susceptible of snagging or catching on any projection.

It is understood that the foregoing is intended as illustrative and not as limitative and that within the purview of the invention various modifications may be made particularly with respect to handle design and lengths and thicknesses of the various structural members described. The invention while particularly useful as a fishing rod is not limited thereto since it may be employed for other purposes where such construction is advantageous.

What is claimed is:

1. A hollow telescopic fishing rod comprising a plurality of extensible and retractable tubular sections of progressively decreasing diameter, a handle member for said fishing rod, the innermost section being of smallest diameter and being of a length greater than the length of the other sections so that when all the sections are retracted one end of the innermost section extends back to the handle to expose its opening for fishing line threading thereinto and therethrough, whereby when the sections are extended the fishing line extends axially through all the sections and beyond, and means mounted on the handle for limiting the inward retracting movement of rod sections other than the innermost rod section.

2. A hollow telescopic fishing rod according to claim 1, wherein the limiting means includes an elongated tubular member through which the innermost rod section retracts and which member has a bevelled end against which the other rod sections abut.

3. A hollow telescopic fishing rod according to claim 2, wherein the elongated tubular member is partially disposed within an outer shorter frustoconical sleeve, the member and sleeve being interengaged by an O-ring connection.

* * * * *